(12) United States Patent
Lin et al.

(10) Patent No.: US 9,829,740 B2
(45) Date of Patent: Nov. 28, 2017

(54) DISPLAY WITH REDUCED COLOR MIXING

(71) Applicant: Apple Inc., Cupertino, CA (US)

(72) Inventors: Shang-Chih Lin, Los Altos, CA (US); Yuan Chen, Orlando, FL (US); Zhibing Ge, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 232 days.

(21) Appl. No.: 14/339,263

(22) Filed: Jul. 23, 2014

(65) Prior Publication Data

US 2016/0026037 A1      Jan. 28, 2016

(51) Int. Cl.
*G02F 1/1333*        (2006.01)
*G02F 1/1335*        (2006.01)

(52) U.S. Cl.
CPC .. *G02F 1/133514* (2013.01); *G02F 1/133512* (2013.01); *G02F 1/133516* (2013.01)

(58) Field of Classification Search
CPC ......... G02F 1/133514; G02F 1/133516; G02F 1/133512; G02F 1/1368; G02F 1/133528
USPC ................................................ 349/110–111
See application file for complete search history.

(56) References Cited

U.S. PATENT DOCUMENTS

| | | | |
|---|---|---|---|
| 5,725,407 A | 3/1998 | Liu et al. | |
| 6,429,916 B1 | 8/2002 | Nakata et al. | |
| 7,498,119 B2 | 3/2009 | Limb et al. | |
| 8,557,620 B2 | 10/2013 | Hong et al. | |
| 2005/0117094 A1* | 6/2005 | Kim | G02F 1/133512 349/110 |
| 2007/0020439 A1* | 1/2007 | Yamamoto | B32B 3/00 428/172 |
| 2010/0328589 A1 | 12/2010 | Kaneko et al. | |
| 2011/0001911 A1* | 1/2011 | Shirai | G02B 5/201 349/106 |
| 2012/0169977 A1* | 7/2012 | Tsubata | G02B 5/201 349/106 |
| 2014/0055879 A1* | 2/2014 | Wang | G02B 5/223 359/891 |
| 2014/0160408 A1* | 6/2014 | Cho | G02F 1/133617 349/110 |

* cited by examiner

*Primary Examiner* — Charles Chang
(74) *Attorney, Agent, or Firm* — Treyz Law Group, P.C.; G. Victor Treyz; Zachary D. Hadd (57) ABSTRACT

A display may have a thin-film transistor layer formed from a layer of thin-film transistor circuitry on a substrate, a color filter layer, and a layer of liquid crystal material interposed between the thin-film transistor layer and the color filter layer. The thin-film transistor layer, the liquid crystal layer, and the color filter layer may be sandwiched between upper and lower polarizers. A backlight unit may supply backlight illumination for pixels in the display. The color filter layer may have a black matrix with an array of openings. Color filter elements of different colors may be formed in the openings. The black matrix may have sidewalls that are steep or that are undercut. The profile of the black matrix helps block improperly colored off-axis light and thereby reduces undesired color mixing in the display.

12 Claims, 11 Drawing Sheets

DISPLAY WITH REDUCED COLOR MIXING

BACKGROUND

This relates generally to electronic devices, and more particularly, to electronic devices with displays.

Electronic devices often include displays. For example, cellular telephones and computers may have displays for presenting information to a user.

Liquid crystal displays contain a layer of liquid crystal material. Pixels in a liquid crystal display contain thin-film transistors and electrodes for applying electric fields to the liquid crystal material. The strength of the electric field in a pixel controls the polarization state of the liquid crystal material and thereby adjusts the brightness of the pixel.

Substrate layers such as color filter layers and thin-film transistor layers are used in liquid crystal displays. A thin-film transistor layer contains an array of thin-film transistors and associated pixel electrodes that are used in controlling electric fields in the liquid crystal layer. A color filter layer contains an array of color filter elements such as red, blue, and green elements. The color filter layer provides the display with the ability to display color images.

The color filter layer contains a black masking material that is patterned to form a grid-shaped black matrix. Openings in the black matrix contain color filter elements. Conventional black matrix openings have gently sloped sidewalls, which can give rise to undesired color mixing between adjacent pixels, particularly in high resolution displays in which small amounts of misalignment between the color filter layer and thin-film transistor layer can be difficult to completely eliminate.

It would therefore be desirable to provide displays with reduced color mixing.

SUMMARY

A display may have a thin-film transistor layer formed from a layer of thin-film transistor circuitry on a substrate, a color filter layer, and a layer of liquid crystal material interposed between the thin-film transistor layer and the color filter layer. The thin-film transistor layer, the liquid crystal layer, and the color filter layer may be sandwiched between upper and lower polarizers. A backlight unit may supply backlight illumination for pixels in the display.

The color filter layer may have a black matrix with an array of openings. Color filter elements of different colors may be formed in the openings. The openings may be aligned with pixel electrodes in the thin-film transistor layer.

The black matrix may have sidewalls that are steep or that are undercut. The steep or undercut profiles of the sidewalls in the black matrix may help block improperly colored off-axis light and thereby reduce undesired color mixing in the display.

DETAILED DESCRIPTION

Electronic devices may include displays. The displays may be used to display images to a user. Illustrative electronic devices that may be provided with displays are shown in FIGS. 1, 2, 3, and 4.

Figure 1:
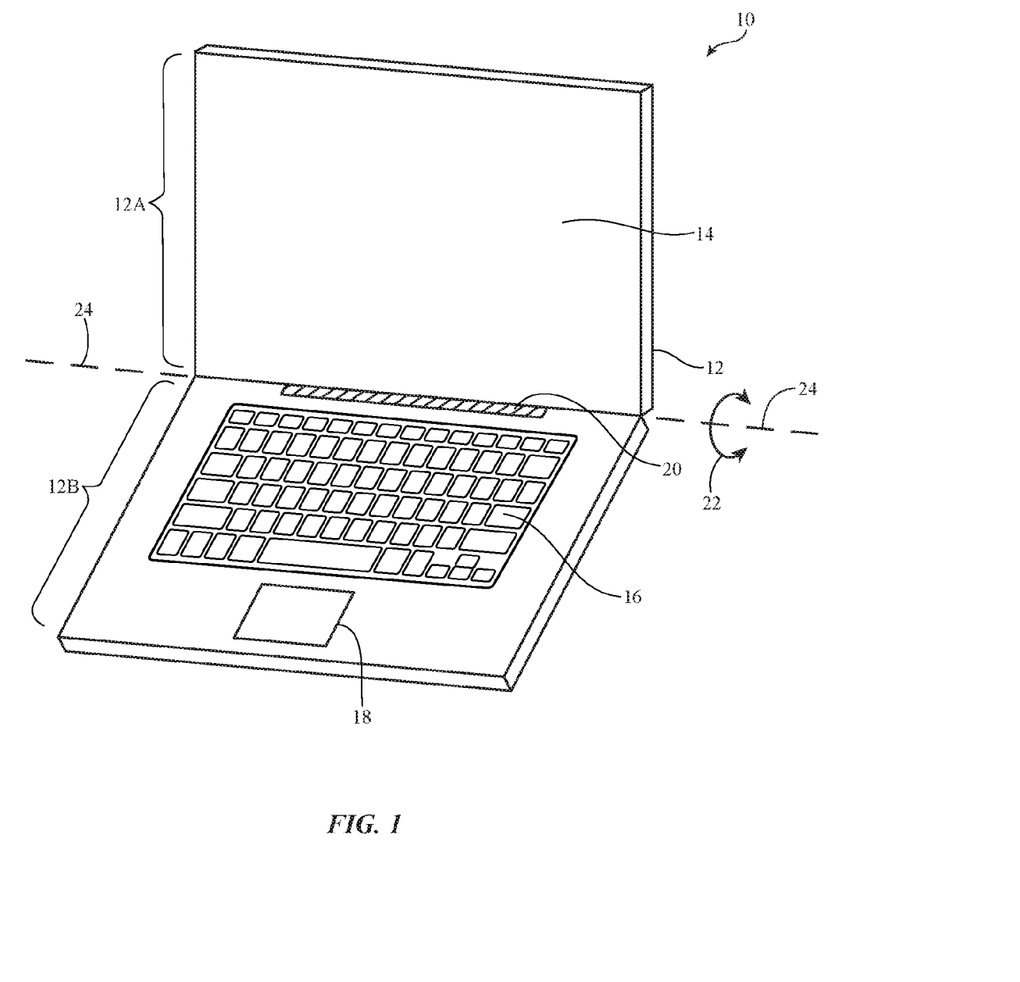
FIG. 1 is a perspective view of an illustrative electronic device such as a laptop computer with a display in accordance with an embodiment.

Illustrative electronic device 10 of FIG. 1 has the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes be referred to as a display housing or lid, may be placed in a closed position by rotating upper housing 12A towards lower housing 12B about rotational axis 24.

Figure 2:
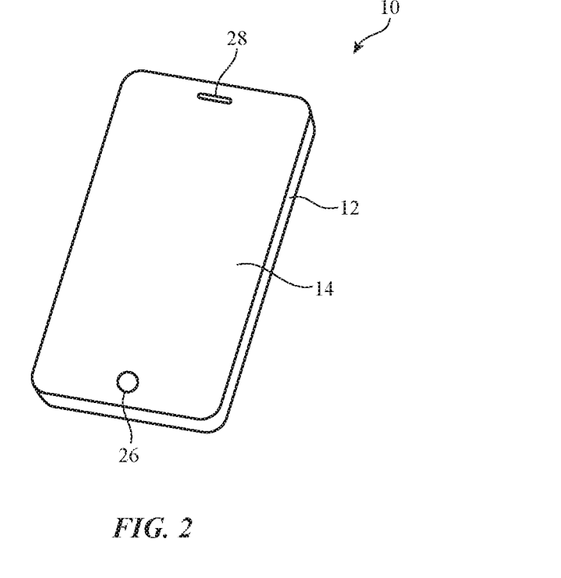
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
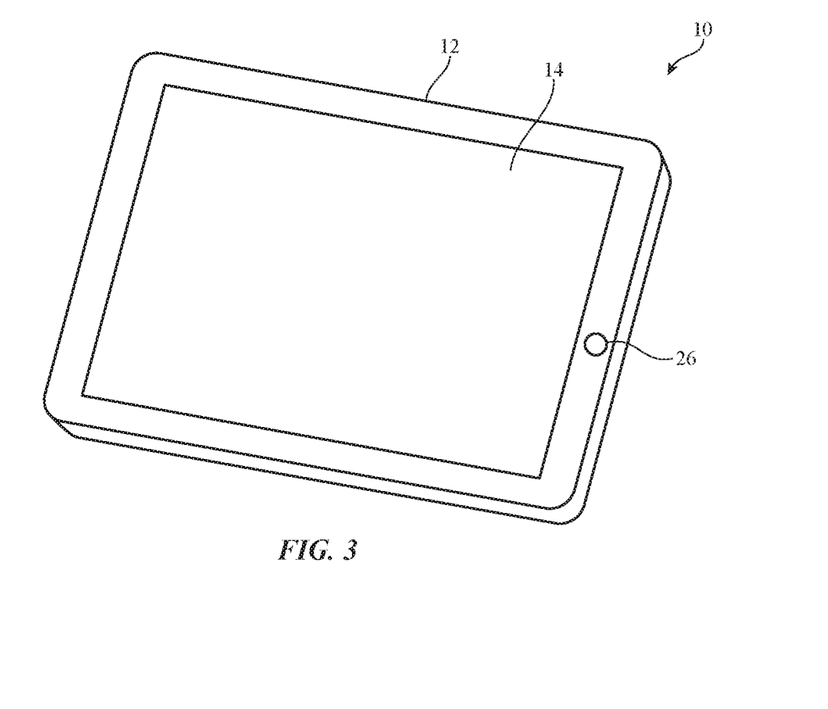
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
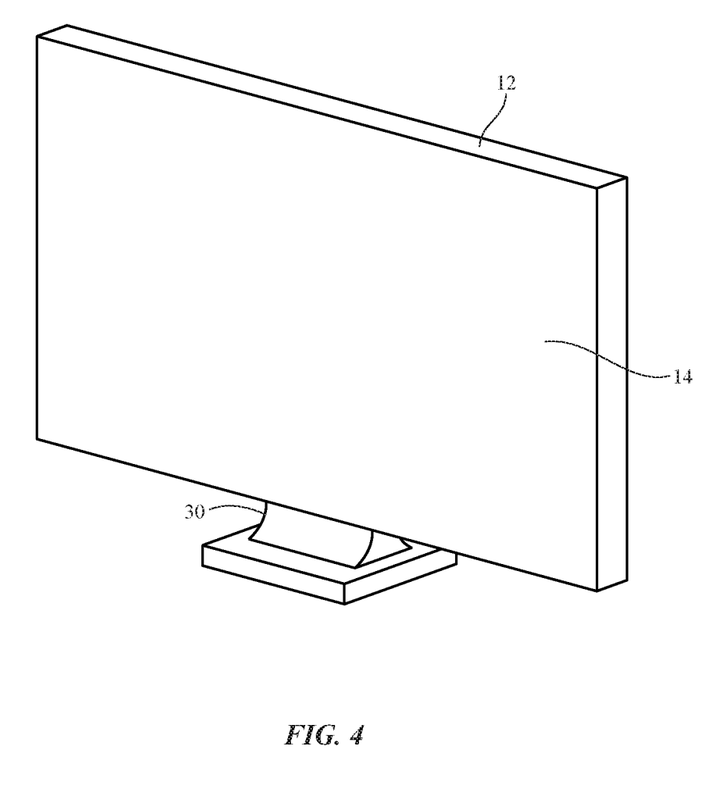
FIG. 4 is a perspective view of an illustrative electronic device such as a computer display with display structures in accordance with an embodiment.

FIG. 4 shows how electronic device 10 may be a computer display, a computer that has been integrated into a computer display, or a display for other electronic equipment. With this type of arrangement, housing 12 for device 10 may be mounted on a support structure such as stand 30 or stand 30 may be omitted (e.g., stand 30 can be omitted when mounting device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may include display pixels formed from liquid crystal display (LCD) components or other suitable image pixel structures.

A display cover layer may cover the surface of display 14 or a display layer such as a thin-film transistor layer or other portion of a display may be used as the outermost (or nearly outermost) layer in display 14. The outermost display layer may be formed from a transparent glass sheet, a clear plastic layer, or other transparent member.

Figure 5:
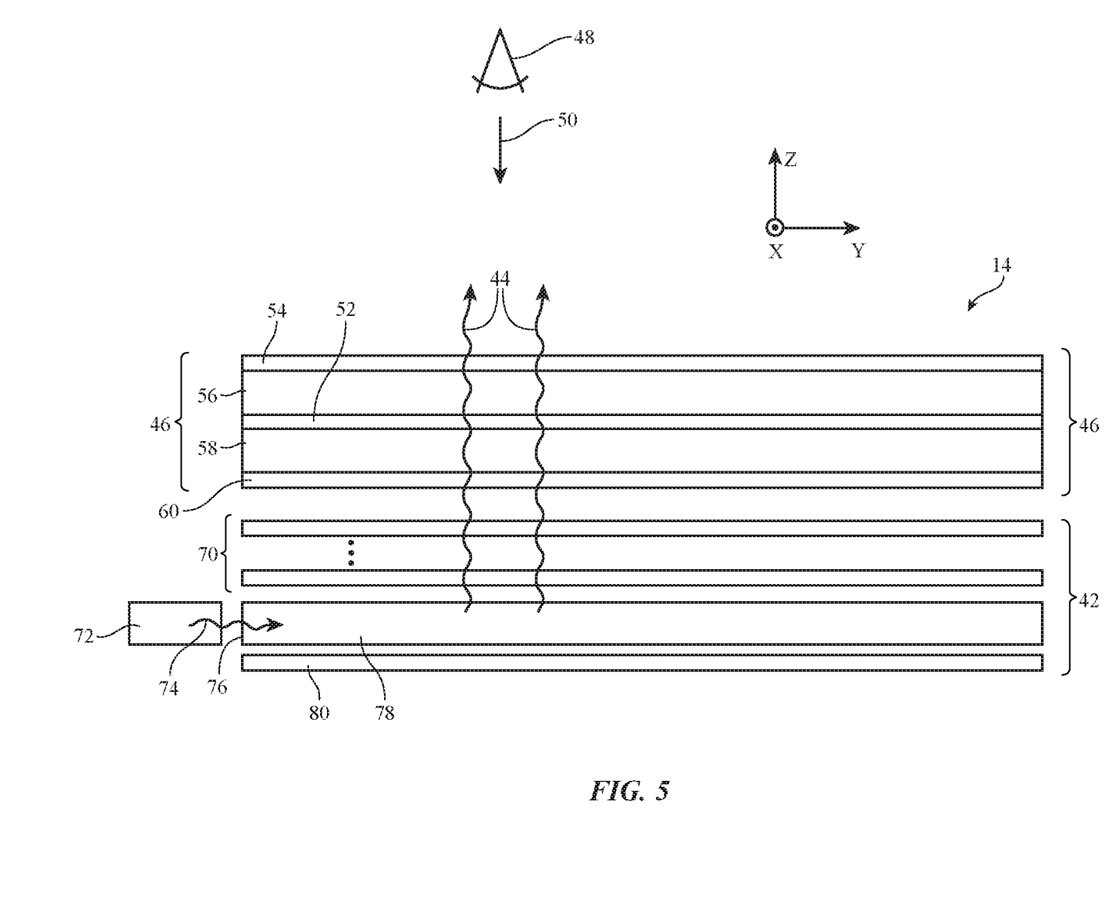
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by user 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 56 may be a thin-film transistor layer that includes an array of thin-film transistors and associated electrodes (display pixel electrodes) for applying electric fields to pixel-sized portions of liquid crystal layer 52 and thereby displaying images on display 14. Layer 58 may be a color filter layer that includes an array of color filter elements for providing display 14 with the ability to display color images. If desired, upper layer 56 may be a color filter layer and lower layer 58 may be a thin-film transistor layer. Another illustrative configuration involves forming color filter elements and thin-film transistor circuits with associated pixel electrodes on a common substrate. This common substrate may be the upper substrate or may be the lower substrate and may be used in conjunction with an opposing glass or plastic layer (e.g., a layer with or without any color filter elements, thin-film transistors, etc.) to contain liquid crystal layer 52. Illustrative configurations for display 14 in which layer 56 is a color filter layer and layer 58 is a thin-film transistor layer are sometimes described herein as an example.

During operation of display 14 in device 10, control circuitry (e.g., one or more integrated circuits on a printed circuit) may be used to generate information to be displayed on display 14 (e.g., display data). The information to be displayed may be conveyed to one or more display driver integrated circuits and other display driver circuitry (e.g., thin-film gate drivers, etc.) using a signal path such as a signal path formed from conductive metal traces in a rigid or flexible printed circuit.

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes. If desired, light sources such as light source 72 may be located along multiple edges of light guide plate 78.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by a reflective film such as reflector 80. Reflector 80 may be formed from a reflective material such as a reflective layer of white plastic or other reflective materials.

To enhance backlight performance for backlight structures 42, backlight structures 42 may include optical films 70. Optical films 70 may include one or more diffuser layers for helping to homogenize backlight 44 and thereby reduce hotspots and one or more prism films (also sometimes referred to as turning films or brightness enhancement films) for collimating backlight 44. Compensation films for enhancing off-axis viewing may be included in optical films 70 or may be incorporated into other portions of display 14 (e.g., in polarizer layers such as layers 54 and/or 60). Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Some of the layers of display 14 may be formed from structures on clear glass or plastic substrates. For example, color filter layer 56 and thin-film transistor layer 58 may each have a substrate layer on which additional structures are formed. In color filter layer 56, an array of color filter elements may be formed on the lower surface of a glass substrate. In thin-film transistor layer 58, a layer of thin-film transistor circuitry may be formed on the upper surface of a glass substrate.

Figure 6:
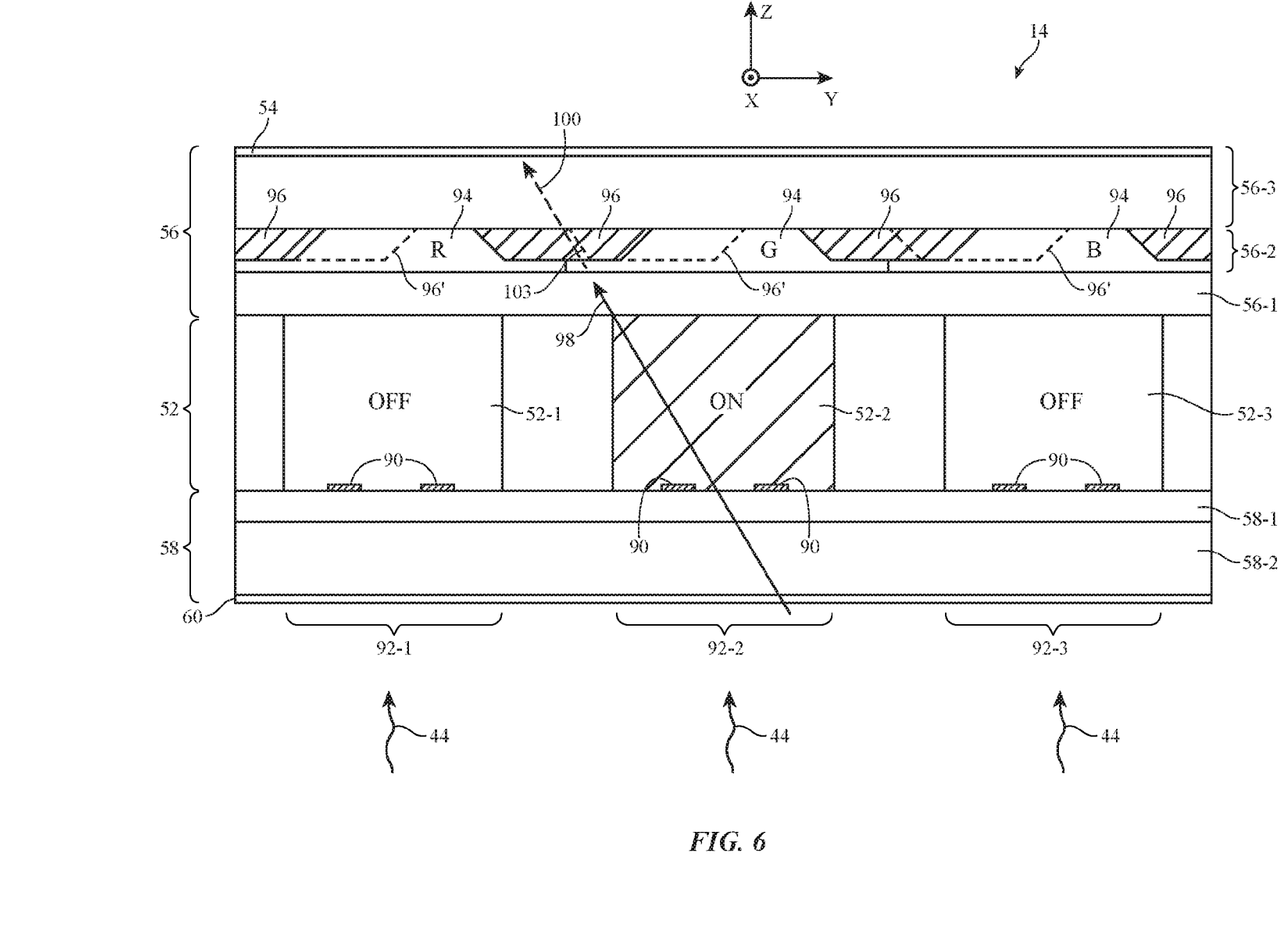
FIG. 6 is a cross-sectional side view of a portion of a display showing how misalignment of a color filter layer with respect to a thin-film transistor layer has a potential to lead to color mixing.

Consider, as an example, the portion of display 14 that is shown in FIG. 6. As shown in FIG. 6, thin-film transistor layer 58 may include a glass or plastic substrate such as substrate 58-2. Thin-film transistor layer 58-1 may be formed from a layer of thin-film transistor circuitry on substrate 58-2. Thin-film transistor circuitry 58-1 may be formed from polysilicon thin-film transistors, indium gallium zinc oxide thin-film transistors, or other silicon or semiconducting oxide thin-film transistors, metal traces that form signal interconnects, metal traces that form pixel electrodes such as pixel electrodes 90, and other thin-film circuitry. The thin-film circuitry of layer 58-1 may include pixel circuits for controlling voltages on respective pixel electrodes 90.

Each set of pixel electrodes 90 is used to supply a controllable amount of electric field to a respective pixel-sized portion of liquid crystal layer 52. In the example of FIG. 6, there are three pixels: pixel 92-1, pixel 92-2, and pixel 92-3, each with a corresponding set of electrodes 90. The pixel circuit of each pixel contains a drive transistor that is used in routing signals from a data line onto the electrodes of that pixel. The strength of the signal on the electrodes of each pixel determines the strength of the electric field in the adjacent portion of liquid crystal layer 52 and thereby determines how much the liquid crystals of that pixel are rotated and how much light is transmitted through that pixel of display 14.

Color filter layer 56 includes color filter layer substrate 56-3 (e.g., a clear glass or plastic layer). Layers 56-2 and 56-1 are formed on the inner surface of substrate 56-3. Layer 56-2 contains an array of color filter elements 94 separated by black matrix 96. Layer 56-3 may be a clear polymer planarization layer (sometimes referred to as an overcoat) on the inner surface of color filter structures 56-2.

Each pixel of display 14 has a respective color. For example, color filter elements 94 may contain red color filter elements such as red color filter element R, green color filter elements such as green color filter element G, and blue color filter elements such as blue color filter element B. Color filter elements 94 may be formed form colored photoimageable polymers or other color filter element material. In the example of FIG. 6, red color filter element R is associated with pixel 92-1, green color filter element G is associated with pixel 92-2, and blue color filter element B is associated with pixel 92-3. In pixel 92-1 and in pixel 92-3, the voltage on electrodes 90 has been adjusted to make the pixel dark (i.e., liquid crystal material 52-1 in pixel 92-1 and liquid crystal material 52-3 in pixel 92-3 have been placed in a non-transmissive "off" state). The voltage on electrodes 90 in pixel 92-2 has been adjusted to make pixel 92-2 light (i.e., liquid crystal material 52-2 in pixel 92-2 has been placed in a transmissive "on" state).

Backlight 44 traverses liquid crystal layer 52 from bottom to top in the orientation of FIG. 6. Backlight 44 that is traveling vertically (i.e., parallel to axis Z) will pass through liquid crystal layer 52 and then through color filter layer 56, which will impart color to the backlight. In the example of FIG. 6, light that passes vertically through liquid crystal material 52-1 and liquid crystal material 52-3, which have been placed in an "off" state, will be blocked and will not exit polarizer 54. Light that passes vertically through liquid crystal material 52-2, which has been placed in an "on" state, will exit polarizer 54 for viewing by a user as part of an image on display 14.

If there is no significant misalignment between color filter layer 56 and thin-film transistor layer 58, the light that passes through liquid crystal material 52-2 will generally pass through green color filter element G and will be properly green in color as expected. Off-axis light (e.g., light that is traveling at an angle with respect to vertical axis Z) also passes through liquid crystal material 52-2. Off-axis light that is oriented at a relatively small angle with respect to axis Z will pass through green color filter element G and will be green in color as desired. Off-axis light that is oriented at larger angles with respect to axis Z will be blocked by black matrix 96, as illustrated by blocked light ray 98. Due to the presence of black matrix 96, off-axis light rays that pass through "on" liquid crystal material 52-2 will not pass through adjacent (incorrectly colored) elements such as element R.

In some situations, however, such as when manufacturing variations give rise to lateral misalignment between color filter layer 56 and thin-film transistor layer 58, there is a potential for undesired color mixing effects. Color mixing occurs when the light rays of one pixel pass through an (incorrectly colored) color filter element of an adjacent pixel. In the FIG. 6 example, dashed line 96' shows where black matrix 96 might be located in the event of misalignment in lateral dimension Y with respect to thin-film transistor layer 58. In an ideal display, black matrix 96 forms a grid with openings that are aligned exactly above corresponding pixel electrodes 90 for different pixels. Due to the misalignment of black matrix 96', off-axis light rays such as ray 98 will not be blocked by black matrix 96'. Rather, ray 98 will pass by left-hand edge 103 of black matrix 96' and will therefore exit the upper surface of display 14 as unblocked light ray 100. A user will view light ray 100 as part of the image being displayed on display 14. Because ray 100 is passing through red color filter element R, rather than green filter element G (in this example), color mixing will be present (i.e.,"on" pixel 92-2 will appear more red in color than desired).

Figure 7:
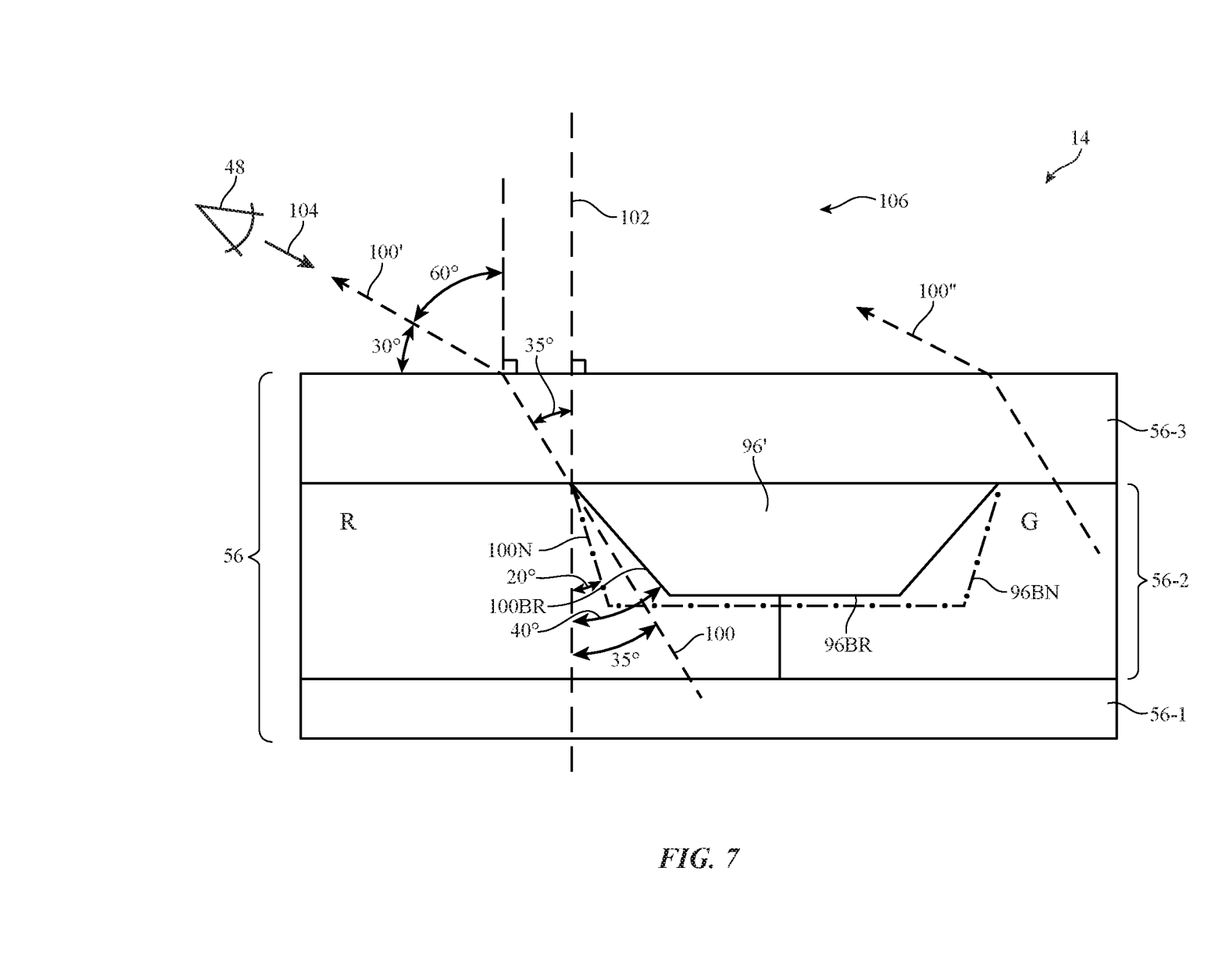
FIG. 7 is a cross-sectional side view of a portion of a color filter layer in a display showing how a black matrix can be provided with steep sidewalls to reduce color mixing in accordance with an embodiment.

As explained in more detail in FIG. 7, color mixing can be influenced by the slope (taper) of the edges (sidewalls) of the black matrix. In the illustrative configuration of FIG. 7, color filter layer 56 has been provided with a black matrix layer of two different profile shapes. Solid line 96BR corresponds to a conventional black matrix profile having edges 100BR that are oriented at about 40° from surface normal 102 to color filter substrate 56-3 (so that edges 100BR lie at an angle of about 50° with respect to the plane dividing layers 56-3 and 56-2). Dash-and-dotted line 100N corresponds to a black matrix profile having edges 100N that are oriented at a steep angle of about 20° with respect to surface normal 102.

Dashed line 100 corresponds to a ray of backlight such as ray 100 of FIG. 7 that bends in the direction shown by ray 100' upon exiting layer 56 and entering surrounding air. Ray 100' corresponds to light that has spread 60° from surface normal 102 (e.g., the maximum spread desired for light from display 14 in the example of FIG. 7). It may be desirable for a user such as user 48 to be able to view rays such as ray 100' in direction 104 when using display 14. It is therefore assumed for the example of FIG. 7 that a viewer may want to view rays such as ray 100'. Proper display operation is assured by eliminating color mixing for such rays.

To prevent color mixing in the scenario of FIG. 7, properly colored rays such as ray 100" that have passed through green color filter G should be allowed to pass to viewer 48 unimpeded, whereas improperly colored rays such as ray 100' should be blocked. Due to the larger index of refraction of layer 56 relative to air 106 above display 14, ray 100 makes a smaller angle with respect to surface normal 102 than ray 100'. In particular, when ray 100' is oriented at an angle of 60° (considered to be the maximum viewing angle for display 14 in this example), ray 100 will be oriented at an angle of 35° with respect to surface normal 102.

Conventional black matrix profiles that involve sidewalls such as sidewall 100BR that are angled at more than 35° with respect to surface normal 102 will be too shallow to block ray 100 and therefore will not block improperly colored ray 100' at viewer 48. In contrast, black matrix structures with edges such as edge 100N that are angled at less than 35° with respect to surface normal 102 (e.g., 20° in the FIG. 7 example) will block rays 100 and 100'.

As the example of FIG. 7 demonstrates, the black matrix in color filter layer 56 preferably has steeply angled sidewalls. The black matrix may, as an example, have a sidewall that is angled at an angle with respect to surface normal 102 that is less than 35°, that is less than 30°, that is less than 25°, that is less than 20°, that is 5-10°, that is 2-20°, that is less than 5°, or that has other suitable values. In configurations in which the black matrix has edge surfaces with steep angles such as these, improperly colored off-axis light rays will be blocked and color mixing will be reduced.

Figure 8:
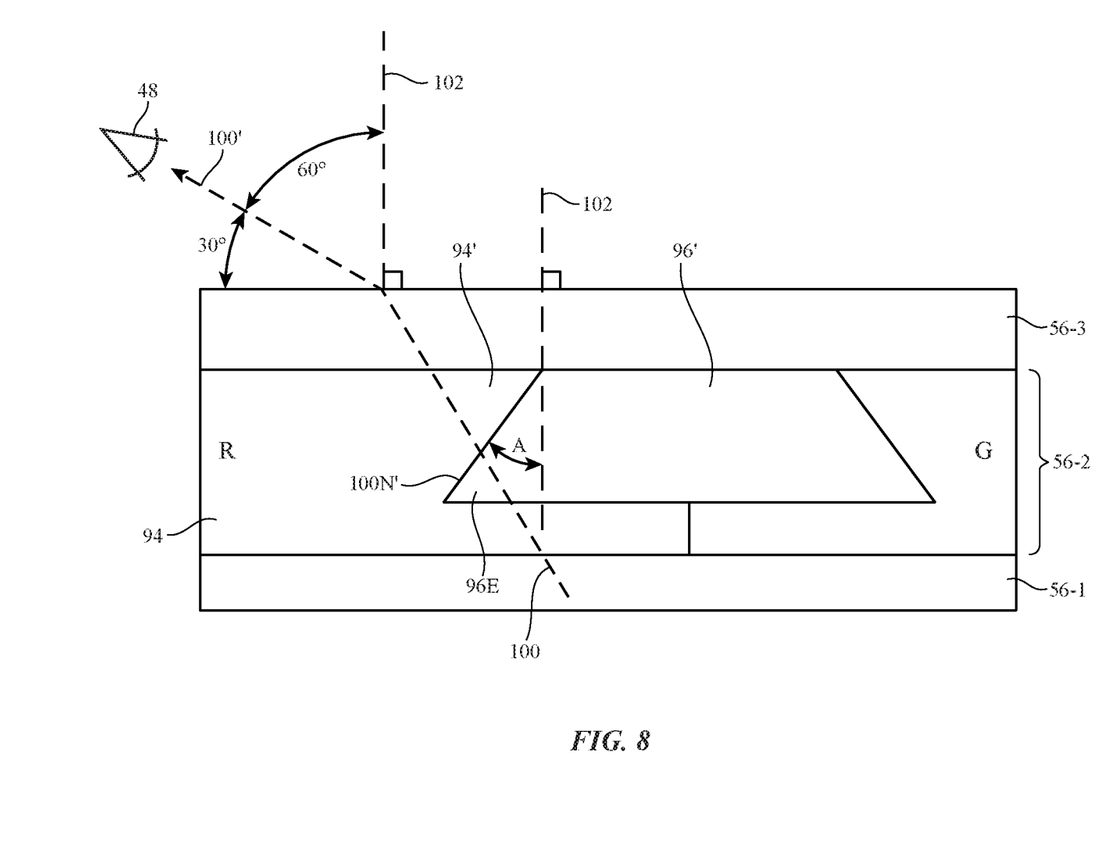
FIG. 8 is a cross-sectional side view of a portion of a color filter layer in a display showing how the use of a black matrix with undercut sidewalls may help reduce color mixing in accordance with an embodiment.

As shown in FIG. 8, improperly colored light rays such as light rays 100 and 100' of FIG. 8 can also be blocked by providing the black matrix with a reverse taper (sometimes referred to as narrowing or undercut sidewalls such as sidewalls 100N'). Sidewalls 100N' may, as an example, be angled at an angle A with respect to surface normal 102 that is greater than 0°, greater than 10°, greater than 20° or that has other suitable values. As shown in FIG. 8, when black matrix 96' has undercut sidewalls, there is color filter material such as material 94' that lies between extended portions such as overhanging portions 96E of black matrix 96' and color filter substrate 56-3. Portion 96E blocks improperly colored off-axis light and therefore reduces color mixing.

Figure 9:
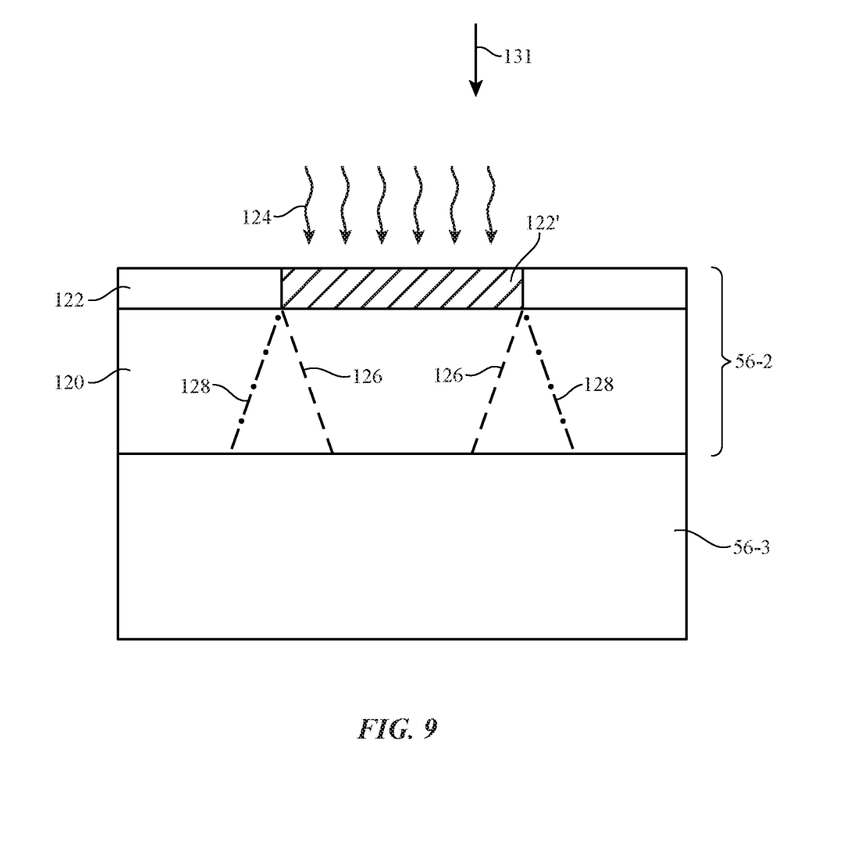
FIG. 9 is a cross-sectional side view of a layer of black masking material such as a polyimide-based black masking material being processed to form a black matrix with steep or undercut sidewalls in accordance with an embodiment.

FIG. 9 shows how black masking material can be processed to form a black matrix structure with steep sidewalls or undercut sidewalls. In the example of FIG. 9, black masking material 120 has been deposited on substrate 56-3. Photoimageable polymer 122 (e.g., positive photoresist) has been deposited on layer 120. Light 124 (e.g., ultraviolet light from a mercury lamp at wavelengths of 300-465 nm or other suitable ultraviolet light) has been used to expose portion 122' of layer 122. Following development in a developer, the remaining portion of layer 122 (i.e., the portions other than exposed portion 122') are removed. Layer 120 can be cured by applying heat (infrared light) in direction 131 from an oven or other heat source. This makes the upper portions of layer 120 (i.e., the portion of layer 120 at the outermost surface of layer 120 near layer 122) denser and more resistant to etching than the lower portions of layer 120 (i.e., the portion of layer 120 at the lower surface of layer 120 bordering layer 56-3). Layer 120 may be formed from a black masking material such as polyimide that incorporates a black material such as carbon black or other opaque additive. Layer 120 may be etched using a wet etch such as an etchant based on tetramethylammonium (TMA). The TMA etch will etch the less dense (lower) portions of layer 120 more than the more dense (upper) portions of layer 120, resulting in a black matrix profile having sidewalls such as undercut sidewalls 126 or at least steeply tapered sidewalls 128 of FIG. 9.

Figure 10:
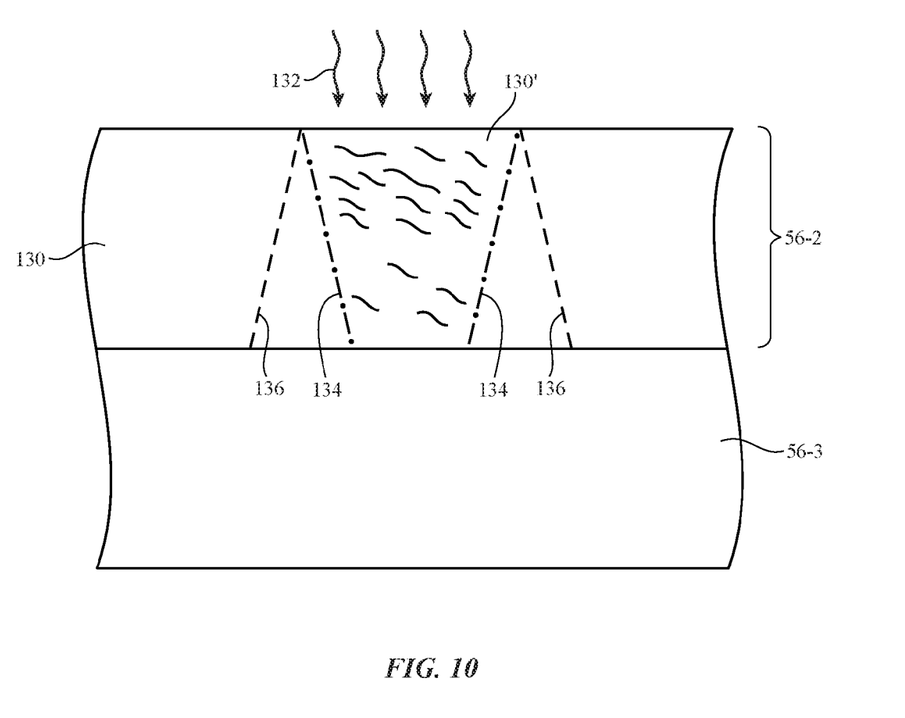
FIG. 10 is a cross-sectional side view of a layer of black masking material such as an acrylic-based black masking material being processed to form a black matrix with steep or undercut sidewalls in accordance with an embodiment.

Another illustrative fabrication technique for forming steep or undercut sidewall profiles in the black matrix involves the use of black matrix material based on photosensitive acrylic that incorporates black material (e.g., carbon black or other opaque additive). When patterning a black matrix material such as photosensitive acrylic, a single layer of black masking material 130 may be deposited on substrate 56-3, as shown in FIG. 10. Light 132 may expose and crosslink portion 130' of layer 130 to form a black matrix on substrate 56-2. Light 132 may be ultraviolet light (e.g., light from a mercury lamp having wavelengths of 300-465 nm). Photoimageable acrylic layer 130 may be configured to have a low sensitivity at wavelengths of greater than about 400 nm. As a result of the low sensitivity to light at 400 nm or more, most exposure and cross-linking of the polymer of portion 130' will take place at upper regions of portion 130'. This is because the absorption depth of light 132 is smaller for shorter wavelengths and larger for longer wavelengths. Following exposure with light 132 to promote cross-linking at the upper surface of portion 130', layer 130 may be etched in a wet etchant such as KOH or NaCO3 or other suitable wet etchant to remove unexposed portions of layer 130 and thereby form the black matrix. Due to the relatively large amount of cross-linking of material 130' at the upper surface of material 130', the resulting black matrix will have undercut sidewalls 134 or at least will have steeply tapered sidewalls such as sidewalls 136.

Figure 11:
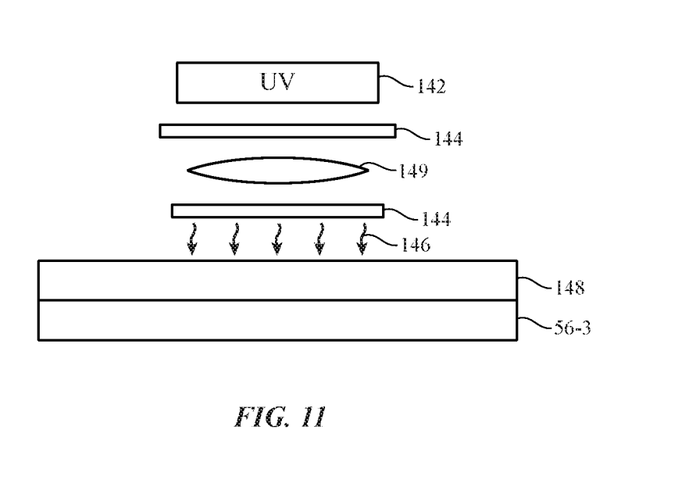
FIG. 11 is a side view of an illustrative photolithographic tool of the type that may be used in fabricating a black matrix for a color filter layer in accordance with an embodiment.

FIG. 11 is a diagram of an illustrative photolithographic tool of the type that may be used to apply light to the photoimageable polymer layers used in forming the black matrix. As shown in FIG. 11, photolithography tool 140 may have ultraviolet light source 142. Light source 142 may be a mercury lamp or other source of short wavelength light. One or more masks such as masks 144 may be used to pattern the light from source 142 and thereby form patterned light 146 for applying to one or more layers of photoimageable polymer on substrate 56-3 such as illustrative layer 148. Optional lens 149 may help direct the light from source 142 into desired portions of layer 148.

Figure 12:
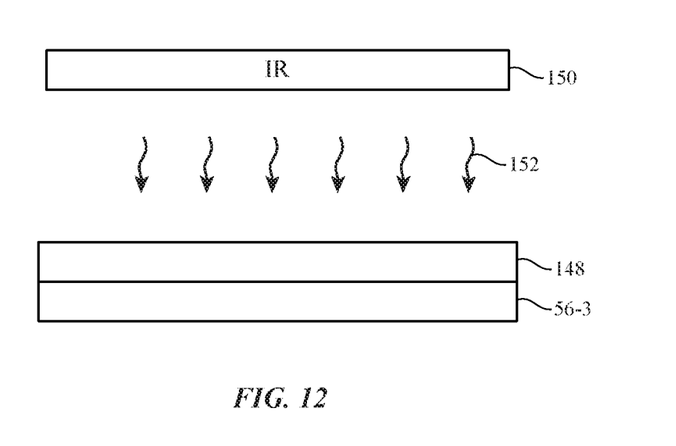
FIG. 12 is a side view of an illustrative infrared heating system that may be used to cure layers of material on a color filter substrate in accordance with an embodiment.

FIG. 12 is an illustrative diagram of a heat source of the type that may be used in curing black matrix polymer on substrate 56-3 as described in connection with FIG. 9. After depositing one or more layers of polymer on substrate 56-3 such as polymer 148, heat source 150 (e.g., an infrared lamp, an oven, or other source that can heat layer 148 from above rather than below as with a conventional hotplate) may generate infrared radiation 152 (sometimes referred to as infrared light, IR light, or heat) that is applied to polymer 148. Because infrared light 152 is applied from the outer surface of layer 148, the outer surface of layer 148 will generally be cured (cross-linked) more than the inner portions of layer 148, helping to form steep and undercut sidewalls, as described in connection with FIG. 9.

Figure 13:
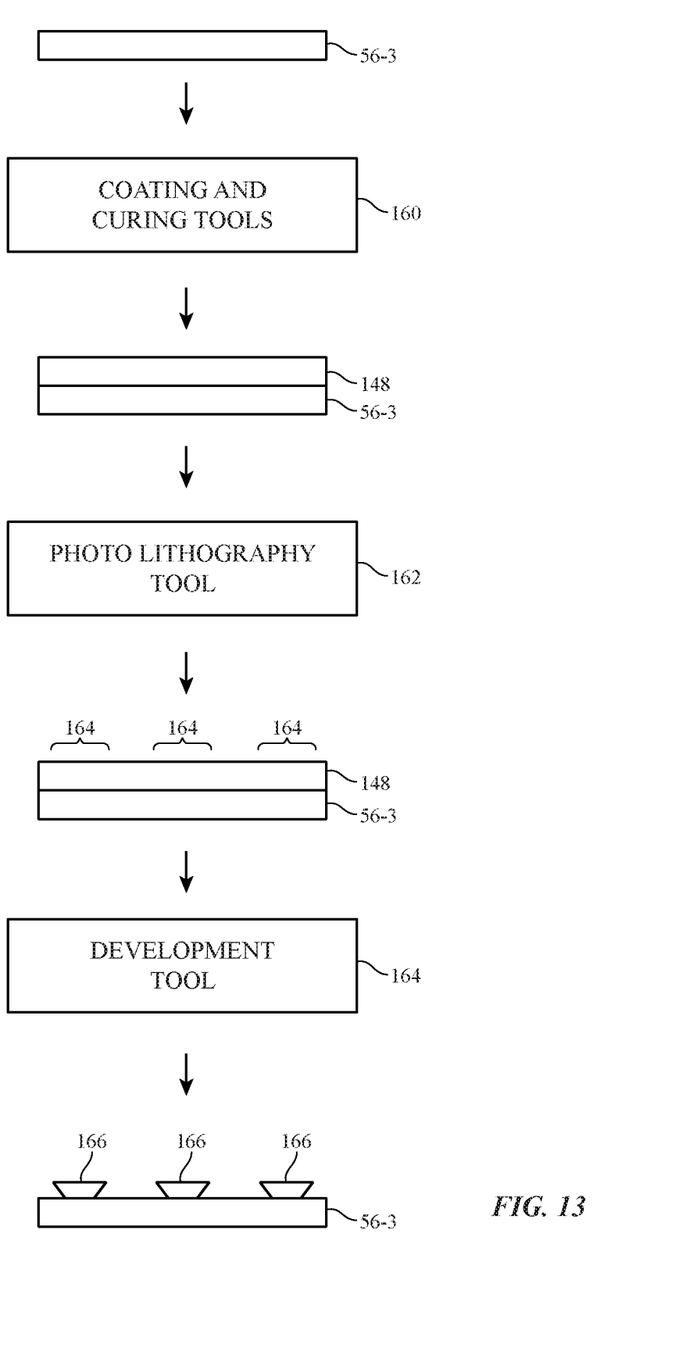
FIG. 13 is a diagram showing equipment and steps involved in forming a black matrix for a color filter in accordance with an embodiment.

A diagram of equipment and operations involved in forming a color filter layer having a black matrix with steep or undercut sidewalls is shown in FIG. 13.

Initially, substrate 56-3 is uncoated. Equipment 160 may be used to apply polymer layers (e.g., a layer of black masking material and an optional photoresist layer) and may be used to cure the applied layer(s). Equipment 160 may include polymer deposition equipment such as spray deposition tools, screen printing tool, spin-on deposition tools, or other equipment for depositing liquid polymer layers). Equipment 160 can also include heating equipment for curing the deposited layers (e.g., an infrared lamp or oven of the type described in connection with FIG. 12, etc.).

Following deposition and curing, polymer 148 (e.g., the black masking layer and, if desired, optional photoresist coating layer) may be exposed to patterned ultraviolet light using photolithography tool 162 (e.g., equipment of the type described in connection with FIG. 11). Exposed areas 164 have the shape of a desired black matrix (e.g., a grid with an array of openings for color filter elements such as a grid with multiple rows and columns of rectangular openings or openings of other shapes).

After exposure using tool 162, development tool 164 may use chemicals (e.g., wet etchants, etc.) to remove unexposed portions of layer 148, thereby forming black matrix 166. Black matrix 166 may have steep or undercut sidewalls. Black matrix 166 may be covered with color filter elements and an overcoat layer to form color filter layer 56. Display 14 may be formed from color filter layer 56, liquid crystal layer 52, thin-film transistor layer 58, and other display layers 46 and backlight 42. Display 14 may then be installed in housing 12 with other components to form device 10.

The foregoing is merely illustrative and various modifications can be made by those skilled in the art without departing from the scope and spirit of the described embodiments. The foregoing embodiments may be implemented individually or in any combination.

What is claimed is:

1. A display, comprising:
a substrate having a surface normal;
a black matrix on the substrate having an array of openings, wherein the black matrix has a first surface and a second surface interposed between the first surface and the substrate, wherein the black matrix is formed from cross-linked black masking material, and wherein an amount of cross-linking in the black masking material increases along the surface normal from the second surface to the first surface; and
color filter elements in the openings, wherein the black matrix has a profile with undercut sidewalls and has overhanging portions, wherein the color filter elements are formed from color filter element material, and wherein at least some of the color filter element material is interposed between the overhanging portions and the substrate.

2. The display defined in claim 1 wherein the black matrix is formed from acrylic.

3. The display defined in claim 1 wherein the substrate comprises a clear substrate layer and wherein the clear substrate layer, the black matrix, and the color filter elements make up a color filter layer.

4. The display defined in claim 3 further comprising a thin-film transistor layer having a layer of thin-film transistor circuitry.

5. The display defined in claim 4 further comprising a layer of liquid crystal material between the color filter layer and the thin-film transistor layer.

6. A display, comprising:
a substrate having a surface normal;
a black matrix on the substrate having an array of openings, wherein the black matrix is formed from black masking material; and
color filter elements in the openings, wherein the black matrix has first and second opposing surfaces and a sidewall surface, wherein the first surface is interposed between the second surface and the substrate, wherein the sidewall surface extends from the second surface to the first surface, wherein the sidewall surface is interposed between the second surface and the substrate, wherein at least one of the color filter elements is interposed between the sidewall surface and the substrate, and wherein the black masking material has a density that increases from the first surface of the black matrix to the second surface of the black matrix.

7. The display defined in claim 6 wherein the sidewalls are angled away from the surface normal by less than 25°.

8. The display defined in claim 7 wherein the black matrix comprises polyimide.

9. The display defined in claim 7 wherein the substrate comprises transparent material and wherein the substrate, the black matrix, and the color filter elements form a color filter layer.

10. The display defined in claim 9 wherein the color filter elements include red color filter elements, green color filter elements, and blue color filter elements.

11. The display defined in claim 10 further comprising a thin-film transistor layer having a layer of thin-film transistor circuitry and a layer of liquid crystal material between the color filter layer and the thin-film transistor layer.

12. The display defined in claim 11 further comprising:
an upper polarizer; and
a lower polarizer, wherein the color filter layer, the layer of liquid crystal material, and the thin-film transistor layer are interposed between the upper polarizer and the lower polarizer.

* * * * *